(12) United States Patent  
Perry (10) Patent No.: US 8,954,714 B2  
(45) Date of Patent: Feb. 10, 2015

(54) PROCESSOR WITH CYCLE OFFSETS AND DELAY LINES TO ALLOW SCHEDULING OF INSTRUCTIONS THROUGH TIME

(75) Inventor: Steven Perry, High Wycombe (GB)

(73) Assignee: Altera Corporation, San Jose, CA (US)

( * ) Notice: Subject to any disclaimer, the term of this patent is extended or adjusted under 35 U.S.C. 154(b) by 572 days.

(21) Appl. No.: 12/698,088

(22) Filed: Feb. 1, 2010

(65) Prior Publication Data

US 2011/0213948 A1    Sep. 1, 2011

(51) Int. Cl.
*G06F 9/30* (2006.01)
*G06F 9/38* (2006.01)

(52) U.S. Cl.
CPC .......... *G06F 9/30174* (2013.01); *G06F 9/3836* (2013.01); *G06F 9/3802* (2013.01); *G06F 9/38* (2013.01); *G06F 9/3853* (2013.01)
USPC ............. 712/214; 712/24; 712/205; 712/207; 712/215; 712/227; 712/E9.037; 712/E9.045; 712/E9.049; 712/E9.055

(58) Field of Classification Search
None
See application file for complete search history.

(56) References Cited

U.S. PATENT DOCUMENTS

| | | | |
|---|---|---|---|
| 4,771,377 A * | 9/1988 | Wiser et al. | 713/600 |
| 5,765,037 A * | 6/1998 | Morrison et al. | 713/502 |
| 5,919,237 A | 7/1999 | Balliet | |
| 6,356,994 B1 * | 3/2002 | Barry et al. | 712/24 |
| 6,453,424 B1 * | 9/2002 | Janniello | 713/500 |
| 6,496,919 B1 | 12/2002 | Nishimoto et al. | |
| 6,496,920 B1 | 12/2002 | Zou et al. | |
| 6,957,322 B1 | 10/2005 | Pickett et al. | |
| 7,502,911 B2 | 3/2009 | Sih et al. | |
| 7,502,912 B2 * | 3/2009 | Sodani et al. | 712/214 |
| 8,074,061 B2 * | 12/2011 | Kaplan | 712/245 |
| 2003/0061473 A1 | 3/2003 | Revilla et al. | |
| 2003/0135712 A1 * | 7/2003 | Theis | 712/214 |
| 2005/0216702 A1 | 9/2005 | Paolucci et al. | |
| 2008/0126718 A1 | 5/2008 | Kottke et al. | |
| 2012/0166878 A1 | 6/2012 | Sinha et al. | |

OTHER PUBLICATIONS

Joachim Schlosser, Development and Verification of fast C/C++ Simulation Models for the Star12 Microcontroller, 2001, section 2.4.2, available at http://alt.schlosser.info/diplomathesis/thesis.html#thesisch2.html.
International preliminary report on patentability, Aug. 16, 2012, PCT application PCT/US2011/023241.
International search report and written opinion of the international search authority, Sep. 16, 2011, PCT application PCT/US/2011/023241.

* cited by examiner

*Primary Examiner* — Kenneth Kim
(74) *Attorney, Agent, or Firm* — Law Offices of Maximilian R. Peterson (57) ABSTRACT

An apparatus includes a processor. The processor includes two memories. The first memory stores one set of instructions. The second memory stores another set of instructions that are longer than the set of instructions in the first memory. An instruction in the set of instructions in the first memory is used as a pointer to a corresponding instruction in the set of instructions in the second memory.

18 Claims, 8 Drawing Sheets

PRIOR ART

PROCESSOR WITH CYCLE OFFSETS AND DELAY LINES TO ALLOW SCHEDULING OF INSTRUCTIONS THROUGH TIME

TECHNICAL FIELD

The disclosed concepts relate generally to electronic circuitry and, more particularly, to efficient processors and associated methods.

BACKGROUND

The complexity of integrated circuits (ICs) continues to increase. Some ICs might include a variety of information-processing hardware, such as processors. The processors interact with other circuitry on the IC, such as general-purpose or specialized logic circuitry, signal conversion circuitry (analog to digital or digital to analog), and the like. By using processors together with other IC circuitry, one may provide a wider range of functionality.

SUMMARY

The disclosed concepts concern apparatus and related methods for efficient processing of information, including data. In one exemplary embodiment, an apparatus includes a processor. The processor includes two memories. The first memory stores one set of instructions. The second memory stores another set of instructions that are longer than the set of instructions in the first memory. An instruction in the set of instructions in the first memory is used as a pointer to a corresponding instruction in the set of instructions in the second memory.

In another exemplary embodiment, an integrated circuit (IC) includes a processor. The processor includes a first memory that stores a set of instructions. The processor also includes a second memory that stores another set of instructions. The set of instructions in the first memory address the set of instructions in the second memory. The second memory contains cycle offsets to allow scheduling of instructions through time.

In another exemplary embodiment, a method includes obtaining a user's program, and determining whether the user's program contains at least one custom instruction. The method further includes storing in a microcode memory of a processor the at least one custom instruction, depending on whether the user's program contains custom instruction(s).

BRIEF DESCRIPTION OF THE DRAWINGS

The appended drawings illustrate only exemplary embodiments and therefore should not be considered as limiting its scope. Persons of ordinary skill in the art who have the benefit of this disclosure appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to electronic circuitry and information processing. More particularly, this disclosure concerns efficient processors and associated methods.

Processors according to the disclosed concepts combine the benefits of relatively short (or narrow) instructions (e.g., the instructions for a complex instruction set computer (CISC)) with relatively long (or wide) instructions (e.g., instructions for a computer or processor with very long instruction word (VLIW)). Thus, in exemplary embodiments, a processor uses a relatively short instruction to access a relatively long instruction.

More specifically, such processors use the relatively short instructions to address and/or decode the relatively long instructions. Some (or all) of the relatively short instructions might act as pointer(s) to the relatively long instructions. The processor therefore uses some (or all) of the relatively shorter instructions to decode a corresponding number of relatively long instruction. The relatively long instruction may contain one or more complex instructions. The instructions may include data, as persons of ordinary skill in the art who have the benefit of the description of the disclosed concepts understand.

In exemplary embodiments, the relatively short instructions act as pointers to a microcode memory. The microcode memory includes part or all of the microcode for the processor. The microcode facilitates execution of instructions by the processor, as persons of ordinary skill in the art who have the benefit of the description of the disclosed concepts understand. The microcode memory contains the relatively long instructions. As noted, each of the relatively long instructions may include one or more instructions. Thus, the processor's instruction set includes relatively short instructions, yet the microcode space or memory contains relatively long instructions.

In some embodiments, the microcode contains cycle offsets to allow an instruction executing in one processor cycle to post fragments of instructions later in time. This scheme allows a "fire-and-forget" instruction style that avoids control problems. It also results in more compact user code. In some embodiments, the microcode space or memory is writable, and allows the user to implement custom instructions suitable for a desired or specified application.

Broadly speaking, one may use processors according to the disclosed concepts for general information processing tasks, as persons of ordinary skill in the art who have the benefit of the description of the disclosed concepts understand. For example, in some embodiments, the processor(s) may execute digital signal processing (DSP) tasks. As another example, in some embodiments, the processor(s) may carry out integer and/or floating-point arithmetic. As yet another example, in some embodiments, the processor(s) may execute data manipulation tasks.

The approach according to the disclosed concepts has several benefits. First, the relatively short instructions offer higher code density. This property is advantageous when using the processors in field programmable gate arrays (FPGAs), programmable logic devices (PLDs), and similar devices. Second, the relatively long instructions provide improved performance. Rather than repeatedly fetch shorter instructions, the processor may access one relatively long instruction, and decode it into several instructions.

Third, the user may make his/her custom instructions, as desired. As noted, in some embodiments, one may write to the microcode memory. Thus, the user may provide his or her instructions, e.g., for a specific task, and write them to the microcode space. Later, when the processor accesses those instructions, it can provide information or data processing suitable to the user's specific task.

Fourth, by taking advantage of the writable microcode space, one may facilitate migration from another processor or computer. Specifically, one may design instructions that "mimic" or realize the instructions in the other device's instruction set, and write the designed instructions to the microcode space.

Figure 1:
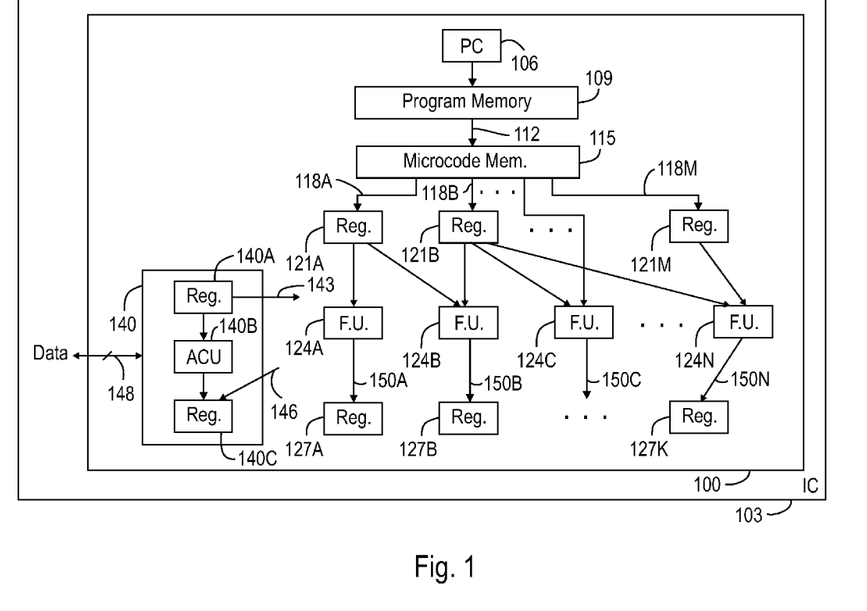
FIG. 1 illustrates a block diagram of an IC that includes a processor according to an exemplary embodiment.

FIG. 1 illustrates an IC 103 that includes a processor 100 according to an exemplary embodiment. Processor 100 includes program counter 106, program memory 109, microcode memory or table 115, register files 121A-121M, functional units (denoted as "F.U.") 124A-124N, and register files 127A-127K (where M, N, and K constitute positive integers).

Program counter 106 facilitates the addressing of program words or instructions in program memory 109. Thus, program counter 106 provides a mechanism for accessing program instructions in program memory 109. The instructions in program memory 109 constitute relatively short instructions, for example, CISC instructions.

Program memory 109 provides program instructions, and possibly data, to microcode memory 115 via link or bus 112. At least some, and maybe all, of the instructions received via link 112 constitute a pointer to the instruction(s) in microcode memory 115. As noted above, the instructions in microcode memory 115 are relatively long instructions, for example, VLIW instructions.

Note that, in addition to instructions, microcode memory 115 may include data (for example, data used by the instructions), as desired. As persons of ordinary skill in the art who have the benefit of the description of the disclosed concepts understand, one may include the data in the same field as the corresponding instruction, or use separate fields for instructions and data, as desired. Furthermore, in addition to, or instead of the data, microcode memory 115 may include an additional field for cycle offsets to allow an instruction executing in one processor cycle to post fragments of instructions later in time, as persons of ordinary skill in the art who have the benefit of the description of the disclosed concepts understand.

Microcode memory 115 includes native instructions of processor 100. In addition, microcode memory 115 may include the user's custom instructions, if any.

Links or buses 118A-118M provide information, such as instructions, data, and/or cycle offsets, from microcode memory 115 to registers 121A-121M. The cycle offsets provide the address at which instructions and/or data are written in registers 121A-121M.

Registers 121A-121M hold data and program code for functional units 124A-124N. Note that each of registers 121A-121M may communicate with or provide information to one or more functional units 124A-124N.

Functional units 124A-124N operate on the data provided by registers 121A-121M. Functional units 124A-124N may perform a wide variety of operations, as persons of ordinary skill in the art who have the benefit of the description of the disclosed concepts understand. For example, one or more functional units may provide addition and/or subtraction operations. As another example, one or more functional units may perform multiplication and/or division operations.

As yet another example, one or more functional units may perform load and/or store operations. The load and store operations allow, for instance, reading data from memory and writing results of operations to memory, respectively. As another example, one or more functional units may provide finite impulse response (FIR) and/or infinite impulse response (IIR) filtering capabilities. As yet another example, one or more functional units may provide branch functionality. The details of the circuitry for the functional units that perform desired operations falls within the knowledge of persons of ordinary skill in the art.

Functional units 124A-124N provide the results of their respective operations to registers 127A-127K via links or buses 150A-150N. For example, suppose that functional unit 124A performs an addition operation on two operands. Functional unit 124A may provide the sum of the operands to register 127A.

As persons of ordinary skill in the art who have the benefit of the description of the disclosed concepts understand, outputs of functional units 124A-124N may in addition or instead couple to other parts of processor 100. For example, outputs of one or more functional units 124A-124N may drive the inputs of one or more functional units 124A-124N, as desired. The choice of signal and outputs propagation depends on various factors, such as the desired architecture and functionality, as persons of ordinary skill in the art who have the benefit of the description of the disclosed concepts understand.

Generally speaking, processor 100 may perform operations on integer data, floating point data, or both, as desired. For example, in some embodiments, functional units 124A-124N may perform both integer and floating point operations. As another example, in some embodiments, functional units 124A-124N may perform only floating point operations.

In some embodiments, processor 100 includes an integer processing unit 140 to perform integer operations (i.e., operations on integer operands, for example, addition, subtraction, multiplication, division, shifting, logic operations, and the like). Integer processing unit 140 includes register 140A, arithmetic-logic unit (ALU) 140B, and register 140C.

Register 140A provides operands or data to ALU 140B. ALU 140B performs the desired or specified operation on the data, and provides the results to register 140C.

Note that, in these embodiments, integer unit 140 may communicate with other parts of processor 100, as desired. Thus, integer processing unit 140 (i.e., one or more of register 140A, ALU 140B, and register 140C) may provide data to other circuitry within processor 100 via link or bus 143. Similarly, integer processing unit 140 (i.e., one or more of register 140A, ALU 140B, and register 140C) may receive data from other circuitry within processor 100 via link or bus 146. Furthermore, integer processing unit 140 may communicate data with circuitry external to processor 100 via link or bus 148, as desired.

Note that although the description above refers to registers, each register may include a register file, as persons of ordinary skill in the art who have the benefit of the description of the disclosed concepts understand. Thus, one or more of registers 121A-121M, 127A-127K, 140A, and 140C may include a register file, i.e., a cluster of two or more registers, as desired.

Figure 2:
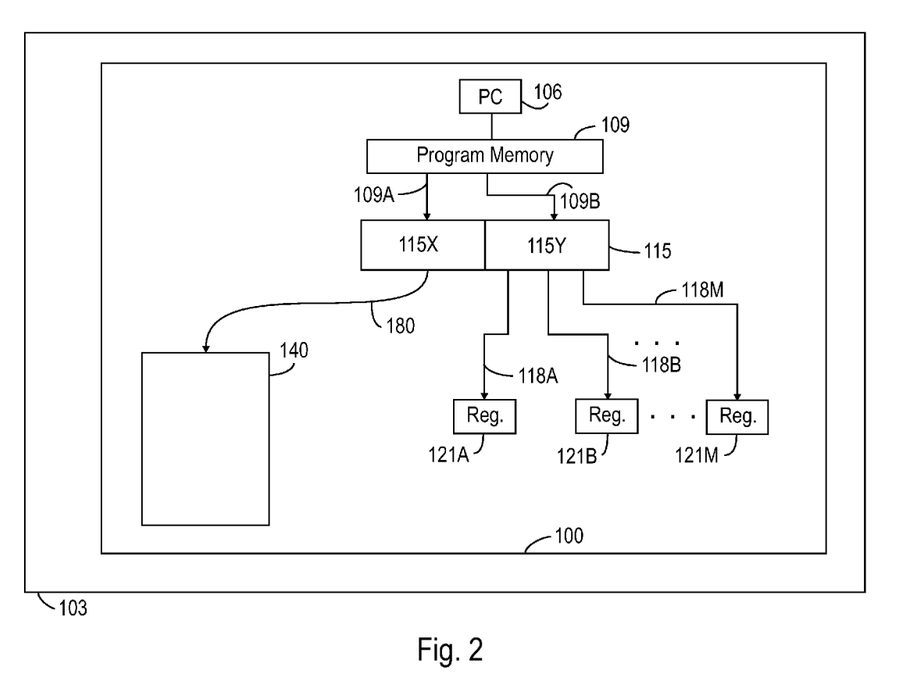
FIG. 2 shows a block diagram of an IC that includes a processor according to another exemplary embodiment.

In some embodiments, processor 100 may have separate integer and floating-point datapaths. For example, processor 100 may store integer and floating point instructions in program memory 109, and microcode memory 115 may likewise include microcode instructions for both integer and floating-point operations. FIG. 2 illustrates such an exemplary embodiment.

Specifically, program memory 109 includes integer and floating-point instructions (both relatively short). The integer and floating-point instructions point to respective integer and floating-point microcode memories. Thus, in the embodiment shown in FIG. 2, integer instructions in program memory 109 serve as pointers 109A to integer microcode memory 115X. Similarly, floating-point instructions in program memory 109 serve as pointers 109B to floating-point microcode memory 115Y.

Integer instructions in integer microcode memory 115X serve as instructions to integer unit processing 140, communicated via link or bus 180. Conversely, floating-point instructions in integer microcode memory 115Y serve as instructions to the floating-point hardware, such as registers 121A-12M, etc.

In other embodiments, processor 100 may include an integer unit or processor or integer processing unit, and a custom datapath. Details of this arrangement are provided in commonly assigned U.S. patent application Ser. No. 12/430,068, titled "Apparatus and Associated Methods For Processors With Custom Datapaths," filed on Apr. 25, 2009, incorporated by reference in this disclosure.

Figure 3:
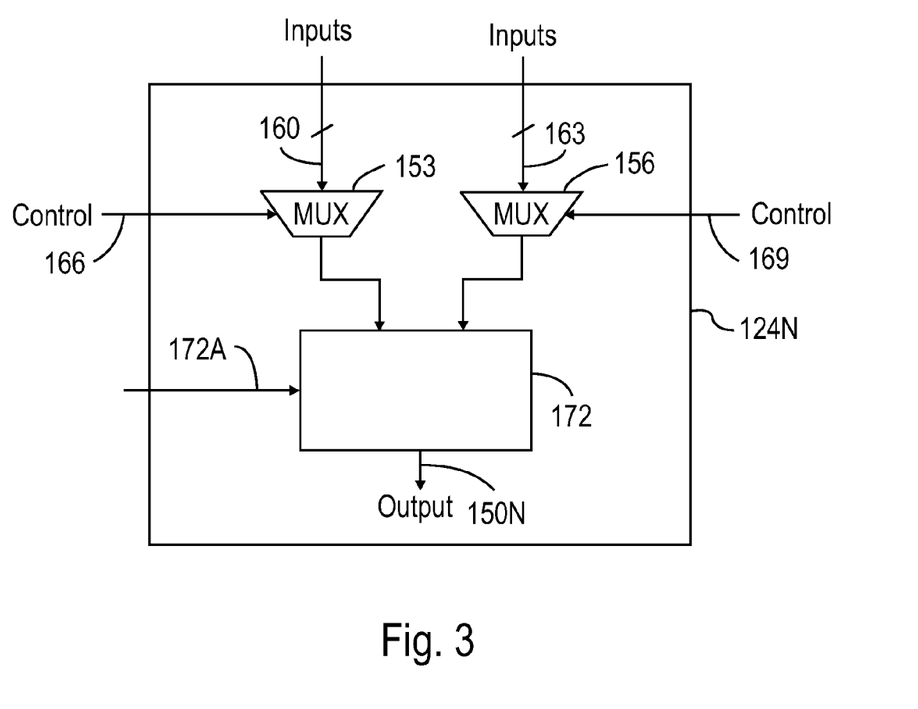
FIG. 3 depicts a block diagram of a functional unit according to an exemplary embodiment.

FIG. 3 depicts details of a functional unit according to an exemplary embodiment. In the example shown, functional unit 124N includes multiplexer (MUX) 153, MUX 156, and functional unit hardware or execution unit 172.

MUX 153 and MUX 156 receive data (e.g., operands) via links or buses 160 and 163, respectively. Control signals 166 and 169 (provided as described below in detail) serve as select signals for MUX 153 and MUX 156, respectively. The outputs of MUX 153 and MUX 156 couple to functional unit hardware 172. Thus, the outputs of MUX 153 and MUX 156 serve as inputs to functional unit hardware 172.

Functional unit hardware 172 performs the desired functionality of functional unit 124N. As noted above, functional unit 124N may perform a wide variety of functions, as desired, depending on the specifications for a given application. In some embodiments, functional unit hardware 172 may also have a control input 172A.

Functional unit hardware 172 provides output 150N of functional unit 124N. Output 150N may couple to follow-on circuitry, for example, to register 127K (see FIG. 1).

As noted above, in some embodiments, the microcode memory (e.g., microcode memory 115 in FIG. 1) contains cycle offsets to allow an instruction executing in one processor cycle to post instruction fragments later in time (e.g., another processor cycle). In other embodiments, an instruction executing in one processor cycle may post other instructions later in time (e.g., another processor cycle). The microcode in these embodiments schedules instructions through time. The microcode passes or propagates through delay lines to control the various hardware in the processor, for example functional blocks 124A-124N in FIG. 1. Using processor offset cycles or scheduling instructions through time results in all, substantially all (e.g., a majority) of the functional units operating and executing instructions simultaneously, rather than in a serial fashion or using complex control schemes.

Figure 4:
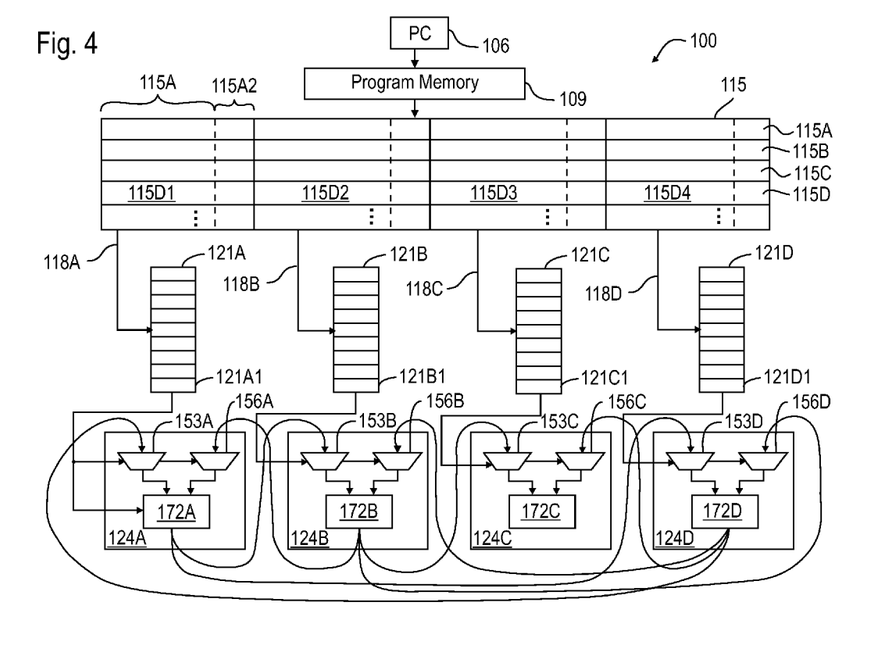
FIG. 4 illustrates a block diagram of a processor according to an exemplary embodiment.

FIG. 4 shows a block diagram of an exemplary embodiment of a processor 100 with this capability. In the exemplary embodiment shown, microcode memory 115 includes several instructions, denoted as words 115A-115D. Each word of microcode memory 115 contains 4 instructions (although one may use other numbers of instructions, as desired).

Note that, as described above, the words of microcode memory 115 may include various fields, for example, instruction, data, and/or cycle offset fields, as desired. More specifically, one or more words of microcode memory 115 may include a field for an instruction, for example, field 115A1. In addition, one or more words of microcode memory 115 may include a field 115A2 for data or cycle offsets. Alternatively, one may use an additional field for data, and yet another additional field (not shown explicitly) for cycle offsets, as desired.

The instructions in each word of microcode memory 115 are scheduled for execution through time. Registers 121A-121D are configured or adapted to act as delay lines. More specifically, delay lines 121A-121D provide random access for writing, and act as a circular buffer when reading their contents.

Links or buses 118A-118D provide information, such as instructions, data, and/or cycle offsets, from microcode memory 115 to registers 121A-121D. The cycle offsets provide the address at which instructions and/or data are written in registers 121A-121D.

Delay lines 121A-121D store the instructions according to their respective cycle offsets to facilitate the scheduling and execution of instructions through time. The order of instructions in the delay lines depends on the order of execution of instructions. More specifically, referring to the boxes representing delay lines 121A-121D, instructions stored at the bottom of delay lines 121A-121D execute first, followed by the next instruction in each delay line, and so on, to the instructions stored in the top of delay lines 121A-121D.

As an example, consider a complex multiply-and-accumulate (CMAC) operation. The CMAC operation may include four instructions 115D1-115D4, stored in a word of microcode 115, say, word 115D. The four instructions 115D1-115D4 may be scheduled for execution in the respective delay lines 121A-121D. Thus, location 121A1 in delay line 121A contains the first instruction, 115D1, location 121B1 in delay line 121B contains the second instruction, 115D2, and so on.

Each of delay lines 121A-121D couples to, and drives inputs of functional units 124A-124D. More specifically, outputs of delay lines 121A-121D drive MUXs 153A-153D, MUXs 156A-156D, etc. As noted above, outputs of one or more functional units 124A-124D may drive inputs of one or more functional units 124A-124D, and/or registers (not shown explicitly). Note that the topology shown in FIG. 4 constitutes merely one example of the number and configuration of instruction words, delay lines, functional units, paths among the various blocks, etc. One may implement a wide variety of other topologies, depending on design and performance specifications for a given implementation, as persons of ordinary skill in the art who have the benefit of the description of the disclosed concepts understand.

Figure 5:
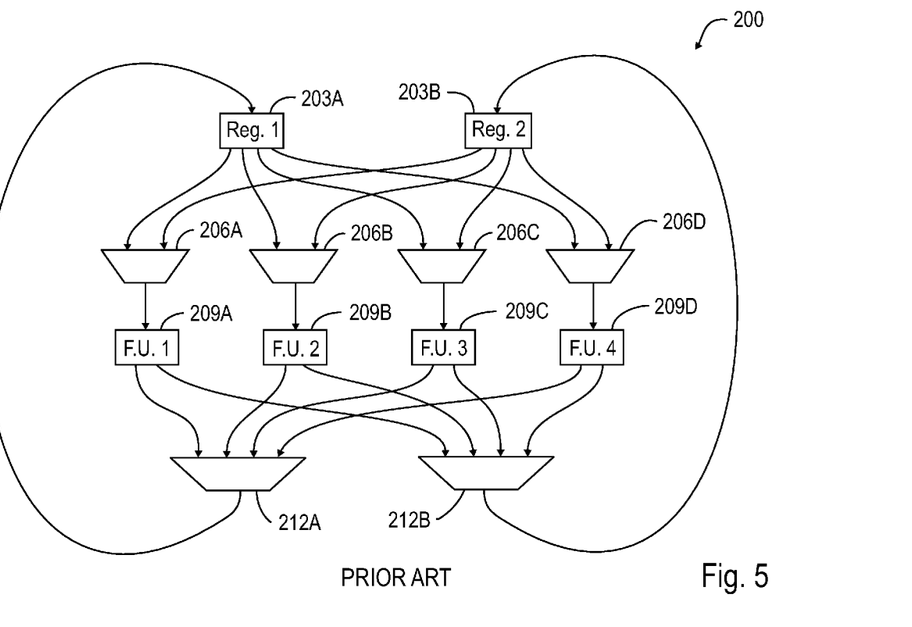
FIG. 5 shows a conventional very long instruction word (VLIW) processor.

As noted above, in some embodiments, microcode memory 115 may include VLIW instructions. Put another way, the instructions in program memory 109 act as pointers to VLIW instructions. FIG. 5 shows a conventional VLIW processor 200.

The details of the operation of VLIW processor fall within the knowledge of persons of ordinary skill. Briefly, VLIW processor 200 includes registers 203A and 203B for holding data. Under the control of multiplexers (MUXs) 206A-206D, registers 203A and 203B provide their contents to functional units 209A-209D, respectively. Functional units 209A-209D operate on the data provided by registers 203A-203B according to the opcodes of instructions. Functional units 209A-209B provide their outputs to MUXs 212A-212B. MUXs 212A-212B selectively provide the outputs of functional units 209A-209D back to registers 203A-203B.

Figure 6:
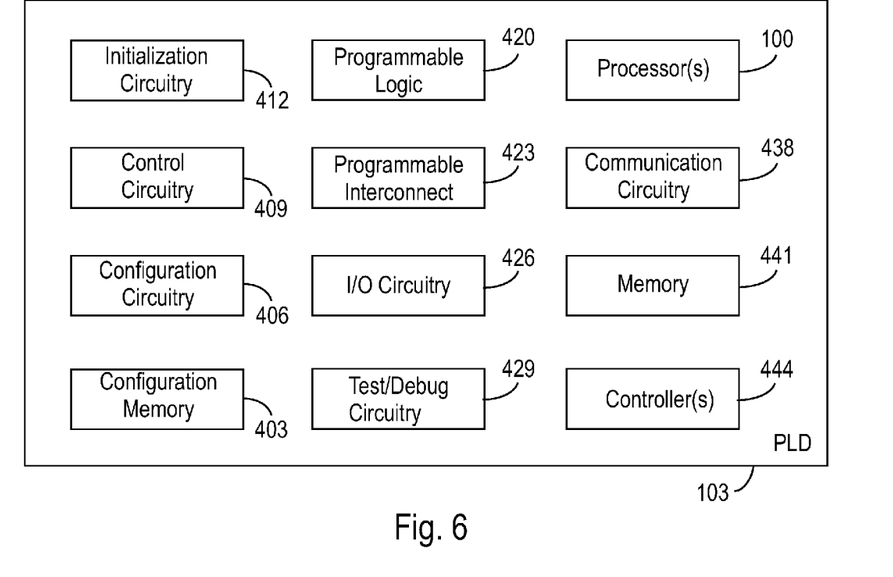
FIG. 6 depicts a block diagram of a programmable logic device (PLD) that may include one or more processors according to an exemplary embodiment.

As noted above, one may apply the disclosed concepts to a variety of ICs, including programmable logic devices (PLDs). FIG. 6 depicts a block diagram of a PLD 103 that may include one or more processors 100 according to an exemplary embodiment.

PLD 103 includes configuration circuitry 406, configuration memory (CRAM) 403, control circuitry 409, programmable logic 420, programmable interconnect 423, and I/O circuitry 426. In addition, PLD 103 may include test/debug circuitry 429, one or more processors 100, one or more communication circuitry 438, one or more memories 441, one or more controllers 444, and initialization circuit 412, as desired.

Note that the figure shows a simplified block diagram of PLD 103. Thus, PLD 103 may include other blocks and circuitry, as persons of ordinary skill in the art understand. Examples of such circuitry include signal and/or clock generation and distribution circuits, redundancy circuits, and the like.

Programmable logic 420 includes blocks of configurable or programmable logic circuitry, such as look-up tables (LUTs), product-term logic, multiplexers (MUXs), logic gates, registers, memory, and the like. Programmable interconnect 423 couples to programmable logic 420 and provides configurable interconnects (coupling mechanisms) between various blocks within programmable logic 420 and other circuitry within or outside PLD 103.

Control circuitry 409 controls various operations within PLD 103. Under the supervision of control circuitry 409, PLD configuration circuitry 406 uses configuration data (which it obtains from an external source, such as a storage device, a host, etc.) to program or configure the functionality of PLD 103. Configuration data are typically stored in CRAM 403. The contents of CRAM 403 determine the functionality of various blocks of PLD 103, such as programmable logic 420 and programmable interconnect 423. Initialization circuit 412 may cause the performance of various functions at reset or power-up of PLD 103.

I/O circuitry 426 may constitute a wide variety of I/O devices or circuits, as persons of ordinary skill in the art who have the benefit of the disclosure understand. I/O circuitry 426 may couple to various parts of PLD 103, for example, programmable logic 420 and programmable interconnect 423. I/O circuitry 426 provides a mechanism and circuitry for various blocks within PLD 103 to communicate with external circuitry or devices.

Test/debug circuitry 429 facilitates the testing and troubleshooting of various blocks and circuits within PLD 103. Test/debug circuitry 429 may include a variety of blocks or circuits known to persons of ordinary skill in the art who have the benefit of the disclosure. For example, test/debug circuitry 429 may include circuits for performing tests after PLD 103 powers up or resets, as desired. Test/debug circuitry 429 may also include coding and parity circuits, as desired.

PLD 103 may also include one or more communication circuits 438. Communication circuit(s) 438 may facilitate data and information exchange between various circuits within PLD 103 and circuits external to PLD 103, as persons of ordinary skill in the art who have the benefit of the disclosure in this document understand.

PLD 103 may further include one or more memories 441 and one or more controller(s) 444. Memory 441 allows the storage of various data and information (such as user-data, intermediate results, calculation results, etc.) within PLD 103. Memory 441 may have a granular or block form, as desired. Controller 444 allows interfacing to, and controlling the operation and various functions of circuitry outside the PLD. For example, controller 444 may constitute a memory controller that interfaces to and controls an external synchronous dynamic random access memory (SDRAM), as desired.

As noted above, PLD 103 may include one or more processors 100. Processor(s) 100 may include an architecture, circuitry, or topology according to the disclosed concepts, as described above in detail.

Processor(s) 100 may couple to other blocks and circuits within PLD 103. For example, processor(s) 100 may couple to memory 441 (and controller(s) 444) to store program instructions, data, arguments, etc. Processor(s) 100 may receive data and information from circuits within or external to PLD 103 and process the information in a wide variety of ways, as persons skilled in the art with the benefit of the disclosure in this document appreciate.

One or more of processor(s) 100 may constitute a digital signal processor (DSP). The DSP(s) allow performing a wide variety of signal processing tasks, such as compression, decompression, audio processing, video processing, filtering, and the like, as desired.

Figure 7:
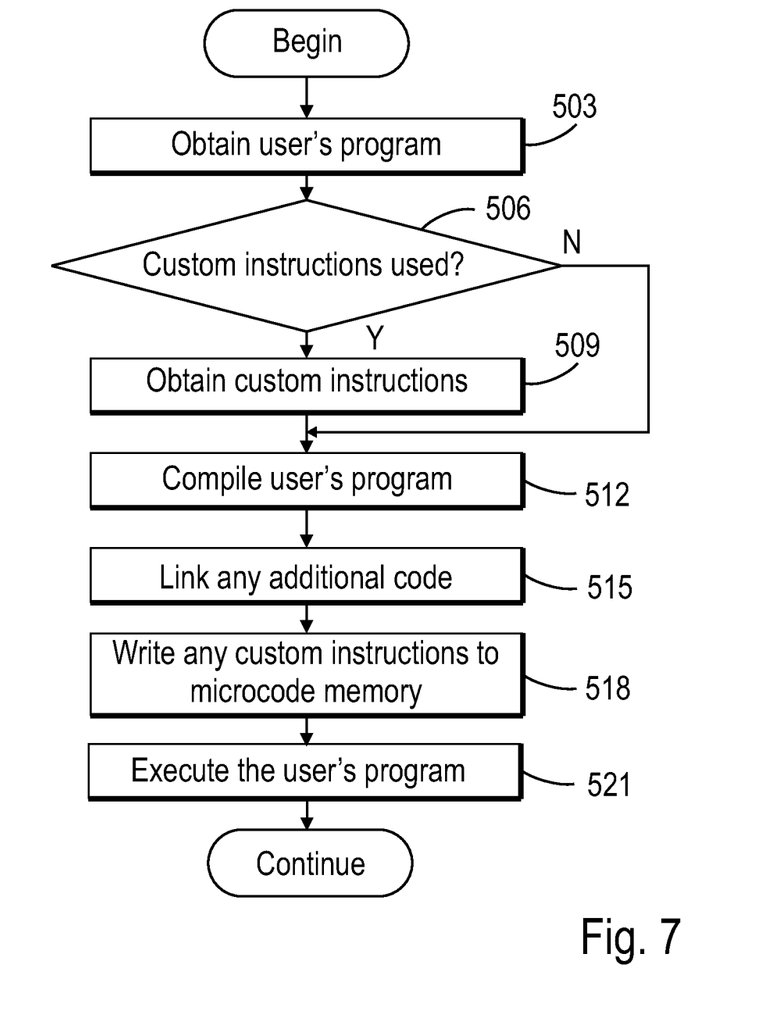
FIG. 7 shows a simplified flow diagram for a method of using processors according to exemplary embodiments.

As noted above, the disclosed concepts include a flexible framework for users to use not only native instructions of processors according to various embodiments, but also write and use their own custom instructions. FIG. 7 shows a simplified flow diagram for a method of using (including programming) processors according to exemplary embodiments.

At 503, the user's program is obtained. Typically, the user's program is written in a higher-level program, such as C. Alternatively, however, users may write their programs in assembly language, as desired.

At 506, the user's program is examined to determine whether it includes any custom instructions (e.g., one or more custom instructions). If not, control passes to 512. Otherwise, at 509, the user's custom instructions are obtained. In some embodiments, the user may explicitly declare such custom instructions. In other embodiments, the custom instructions are detected automatically. The user should in either case provide a definition of the custom instructions, together with the instructions to be written to microcode memory 115 (see, for example, FIG. 1).

Referring to FIG. 7, at 512 the user's program is compiled. At 515, any additional code (for example, external code segments, routines, libraries) are linked. At 518, custom instructions, if any, are written to microcode memory 115 (see FIGS. 1, 3). Note that, in addition to the custom instructions, microcode memory 115 may include provisions for the processor's native instructions, as desired.

At 521, the user's program is executed on processor 100, using the resources of processor 100. The resources of processor 100 may include, without limitation, the circuitry shown in FIGS. 1-4, and described above.

Figure 8:
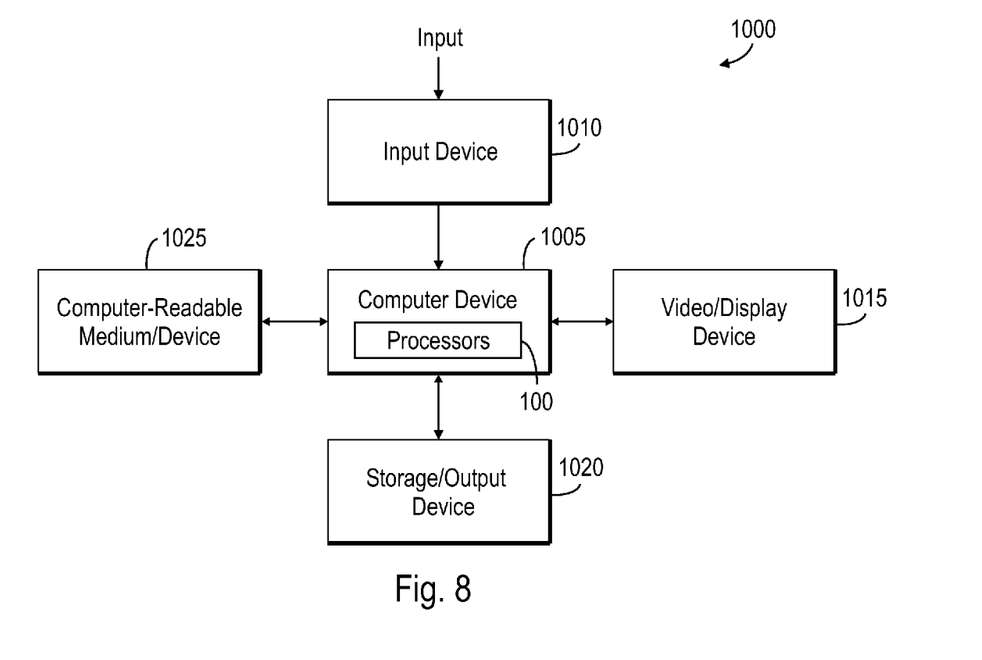
FIG. 8 illustrates a block diagram of an exemplary computer system for processing information according to the disclosed concepts.

One may run or execute the method shown in FIG. 7 on computer systems or processors. FIG. 8 shows a block diagram of an exemplary computer system 1000 for processing information according to the disclosed concepts. Persons of ordinary skill in the art who have the benefit of the disclosure understand that one may use a wide variety of other computer systems, processors, microcomputers, workstations, and the like, as desired.

System 1000 includes a computer device 1005, an input device 1010, a video/display device 1015, and a storage/output device 1020, although one may include more than one of each of those devices, as desired.

Computer device 1005 couples to input device 1010, video/display device 1015, and storage/output device 1020. System 1000 may include more that one computer device 1005, for example, a set of associated computer devices or systems, as desired, and as persons of ordinary skill in the art who have the benefit of the description of the disclosed concepts understand.

System 1000 operates in association with input from a user. The user input typically causes system 1000 to perform specific desired information-processing tasks, including circuit synthesis and simulation. System 1000 in part uses computer device 1005 to perform those tasks. Computer device 1005 includes an information-processing circuitry, such as a central-processing unit (CPU), although one may use more than one CPU or information-processing circuitry, as persons skilled in the art would understand.

In some embodiments, system 1000 and, more particularly, computer device 1005, may include one or more processors 100 according to the disclosed concepts (see, for example, FIGS. 1-4). In some embodiments, system 1000 may include one or more processors 100 according to the disclosed concepts, and may also run or execute the method shown in FIG. 7 as well as the user's program (using one or more processors 100).

Referring to FIG. 8, input device 1010 receives input from the user and makes that input available to computer device 1005 for processing. The user input may include data, instructions, or both, as desired. Input device 1010 may constitute an alphanumeric input device (e.g., a keyboard), a pointing device (e.g., a mouse, roller-ball, light pen, touch-sensitive apparatus, for example, a touch-sensitive display, or tablet), or both. The user operates the alphanumeric keyboard to provide text, such as ASCII characters, to computer device 1005. Similarly, the user operates the pointing device to provide cursor position or control information to computer device 1005.

Video/display device 1015 displays visual images to the user. The visual images may include information about the operation of computer device 1005, such as graphs, pictures, images, and text. The video/display device may constitute a computer monitor or display, a projection device, and the like, as persons of ordinary skill in the art would understand. If a system uses a touch-sensitive display, the display may also operate to provide user input to computer device 1005.

Storage/output device 1020 allows computer device 1005 to store information for additional processing or later retrieval (e.g., softcopy), to present information in various forms (e.g., hardcopy), or both. As an example, storage/output device 1020 may constitute a magnetic, optical, or magneto-optical drive capable of storing information on a desired medium and in a desired format. As another example, storage/output device 1020 may constitute a printer, plotter, or other output device to generate printed or plotted expressions of the information from the computer device 1005.

Computer-readable medium 1025 interrelates structurally and functionally to computer device 1005. Computer-readable medium 1025 stores, encodes, records, and/or embodies functional descriptive material. By way of illustration, the functional descriptive material may include computer programs, computer code, computer applications, and/or information structures (e.g., data structures or file systems). When stored, encoded, recorded, and/or embodied by computer-readable medium 1025, the functional descriptive material imparts functionality. The functional descriptive material interrelates to computer-readable medium 1025.

Information structures within the functional descriptive material define structural and functional interrelations between the information structures and computer-readable medium 1025 and/or other aspects of system 1000. These interrelations permit the realization of the information structures' functionality. Moreover, within such functional descriptive material, computer programs define structural and functional interrelations between the computer programs and computer-readable medium 1025 and other aspects of system 1000. These interrelations permit the realization of the computer programs' functionality.

By way of illustration, computer device 1005 reads, accesses, or copies functional descriptive material into a computer memory (not shown explicitly in the figure) of computer device 1005. Computer device 1005 performs operations in response to the material present in the computer memory. Computer device 1005 may perform the operations of processing a computer application that causes computer device 1005 to perform additional operations. Accordingly, the functional descriptive material exhibits a functional interrelation with the way computer device 1005 executes processes and performs operations.

Furthermore, computer-readable medium 1025 constitutes an apparatus from which computer device 1005 may access computer information, programs, code, and/or applications. Computer device 1005 may process the information, programs, code, and/or applications that cause computer device 1005 to perform additional operations.

Note that one may implement computer-readable medium 1025 in a variety of ways, as persons of ordinary skill in the art would understand. For example, memory within computer device 1005 may constitute a computer-readable medium 1025, as desired. Alternatively, computer-readable medium 1025 may include a set of associated, interrelated, coupled (e.g., through conductors, fibers, etc.), or networked computer-readable media, for example, when computer device 1005 receives the functional descriptive material from a network of computer devices or information-processing systems. Note that computer device 1005 may receive the functional descriptive material from computer-readable medium 1025, the network, or both, as desired.

Note that the description provided in this patent disclosure uses the generic term "processor" without intending to limit the scope of the disclosed concepts. As persons of ordinary skill in the art who have the benefit of the description of the disclosed concepts understand, one may apply the disclosed concepts to a variety of circuitry that may be known by other names. Without limitation, examples of such circuitry include controllers, state machines, and microprocessors. Generally, one may apply the disclosed concepts to information-processing apparatus.

In addition, although the description above refers to the use of two memories, one may use additional memories, as desired, by making appropriate modifications that fall within the skill and knowledge of persons of ordinary skill in the art who have the benefit of the description of the disclosed concepts. For example, one may use a hierarchy of three or more memories that can be used to decode instructions in a hierarchical manner, as desired.

Furthermore, as persons of ordinary skill in the art who have the benefit of the description of the disclosed concepts understand, one may apply the disclosed concepts effectively to various types of IC. Without limitation, examples described in this document constitute merely illustrative applications. Thus, one may apply the disclosed concepts to various types of IC (e.g., ASICs, ASSPs, FPGAs, CPLDs, etc.) by making appropriate modifications. Those modifications fall within the knowledge and level of skill of persons of ordinary skill in the art who have the benefit of the description of the disclosed concepts.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation, as persons of ordinary skill in the art who have the benefit of the description of this disclosure understand. Other modifications and alternative embodiments in addition to those described here will be apparent to persons of ordinary skill in the art who have the benefit of this disclosure. Accordingly, this description teaches those skilled in the art the manner of carrying out the disclosed concepts and are to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art who have the benefit of this disclosure may use certain features of the disclosed concepts independently of the use of other features, without departing from the scope of the disclosed concepts.

The invention claimed is:

1. An integrated circuit (IC), comprising:
    a processor, the processor comprising:
        a first memory that stores a first set of instructions that addresses a second set of instructions;
        a second memory that stores the second set of instructions, wherein the second memory contains cycle offsets to allow scheduling of instructions through time, and wherein the second memory is writable in order to implement custom instructions for a desired or specified application; and
        a plurality of delay lines coupled to the second memory, the plurality of delay lines storing instructions according to their respective cycle offsets.

2. The integrated circuit (IC), according to claim 1, wherein an instruction in the second set of instructions can post in one processor cycle instruction fragments to another processor cycle.

3. The integrated circuit (IC), according to claim 1, wherein each delay line in the plurality of delay lines provides random access during a write operation.

4. The integrated circuit (IC), according to claim 3, wherein each delay line in the plurality of delay lines comprises a circular buffer during a read operation.

5. The integrated circuit (IC), according to claim 3, further comprising a plurality of functional units coupled to the plurality of delay lines.

6. The integrated circuit (IC), according to claim 1, wherein each instruction in the first set of instructions comprises a single instruction.

7. The integrated circuit (IC), according to claim 6, wherein each instruction in the first set of instructions comprises a complex instruction set computer (CISC) instruction.

8. The integrated circuit (IC), according to claim 1, wherein each instruction in the second set of instructions comprises more than one instruction.

9. The integrated circuit (IC), according to claim 8, wherein each instruction in the second set of instructions comprises a very long instruction word (VLIW) instruction.

10. A method of using a processor, the processor comprising first and second memories, the method comprising:
    storing in the first memory a first set of instructions that addresses a second set of instructions;
    storing in the second memory the second set of instructions, wherein the second memory contains cycle offsets to allow scheduling of instructions through time, and wherein the second memory is writable in order to implement custom instructions for a desired or specified application; and
    using a plurality of delay lines cooperatively with the second memory, the plurality of delay lines storing instructions according to their respective cycle offsets.

11. The method according to claim 10, wherein an instruction in the second set of instructions can post in one processor cycle instruction fragments to another processor cycle.

12. The method according to claim 10, wherein using the plurality of delay lines further comprises providing random access during a write operation.

13. The method according to claim 10, wherein using the plurality of delay lines further comprises providing a circular buffer during a read operation.

14. The method according to claim 10, further comprising using a plurality of functional units cooperatively with the plurality of delay lines.

15. The method according to claim 10, wherein each instruction in the first set of instructions comprises a single instruction.

16. The method according to claim 15, wherein each instruction in the first set of instructions comprises a complex instruction set computer (CISC) instruction.

17. The method according to claim 10, wherein each instruction in the second set of instructions comprises more than one instruction.

18. The method according to claim 15, wherein each instruction in the second set of instructions comprises a very long instruction word (VLIW) instruction.

* * * * *